United States Patent
Coppersmith et al.

(10) Patent No.: US 7,236,592 B2
(45) Date of Patent: Jun. 26, 2007

(54) EFFICIENT STREAM CIPHER SYSTEM AND METHOD

(75) Inventors: Don Coppersmith, Ossining, NY (US); Shai Halevi, Elmsford, NY (US); Charanjit Jutla, Elmsford, NY (US)

(73) Assignee: International Business Machines Corporation, Armonk, NY (US)

(*) Notice: Subject to any disclaimer, the term of this patent is extended or adjusted under 35 U.S.C. 154(b) by 869 days.

(21) Appl. No.: 10/066,041

(22) Filed: Feb. 1, 2002

(65) Prior Publication Data

US 2003/0152219 A1    Aug. 14, 2003

(51) Int. Cl.
*H04K 1/00* (2006.01)
*H04K 1/04* (2006.01)
*H04L 9/00* (2006.01)

(52) U.S. Cl. ............................. 380/37; 380/28; 380/42

(58) Field of Classification Search .................... 380/37
See application file for complete search history.

(56) References Cited

U.S. PATENT DOCUMENTS 3,796,830 A * 3/1974 Smith ........................ 380/37
5,454,039 A * 9/1995 Coppersmith et al. ........ 380/28

* cited by examiner

*Primary Examiner*—Gilberto Barrón, Jr.
*Assistant Examiner*—Abdulhakim Nobahar
(74) *Attorney, Agent, or Firm*—Raphael Perez-Pineiro, Hoffman, Warnick & D'Alessandro; LLP (57) ABSTRACT

A computer system and method generates a random output stream of bits. The system comprises an initial evolving state produced from one or more initial keys, one or more round functions, and one or more mask tables. Each round function is part of a step in a sequence of steps. Each step applies the respective round function to a current evolving state to produce a respective new evolving state for processing by the next step in the sequence. The first step in the sequence starts b processing the initial evolving state. The mask tables are produced from one or more of the initial keys. Each of the mask tables has one or more masks. The masks are combined, in each respective step, with the respective new evolving state in a combination operation to create a respective step output. The random output stream bits is a concatenation of each of the respective step outputs. In one preferred embodiment, one or more of the masks in the mask tables are replaced by one or more replacement masks after a number of combination operations. The replacement masks not being linear combinations of prior masks. In an alternative embodiment, there are two or more mask tables produced from one or more of the initial keys. One or more of the masks from each table is combined, in each respective step, with the respective new evolving state in a combination operation to create a respective step output. There may or may not be replacement of the masks in this embodiment.

20 Claims, 7 Drawing Sheets

Figure. 1. Typical usage of a stream cipher
PRIOR ART

Figure 2. Structure of a typical stream cipher
PRIOR ART

610 $\begin{pmatrix} a & c & e & g \\ b & d & f & h \end{pmatrix}$   600 byte substitution 601   replace each byte x by S[x]

602 $\begin{pmatrix} S[a] & S[b] & S[c] & S[d] \\ S[b] & S[d] & S[f] & S[h] \end{pmatrix}$ row shift 603   rotate the second row by one byte to the right

604 $\begin{pmatrix} S[a] & S[b] & S[c] & S[d] \\ S[h] & S[b] & S[d] & S[f] \end{pmatrix}$ column mix 605   replace each column c by M * c 606 $\begin{pmatrix} a' & c' & e' & g' \\ b' & d' & f' & h' \end{pmatrix}$

EFFICIENT STREAM CIPHER SYSTEM AND METHOD

FIELD OF THE INVENTION

This invention relates to data encryption. More specifically, the invention relates to an improved software-efficient stream cipher.

BACKGROUND OF THE INVENTION

Cryptographic systems are widely used to ensure the privacy and authenticity of messages communicated over insecure channels. In many applications, it is necessary that encryption be performed at high data rates, a requirement usually achieved, if at all, with the help of supporting cryptographic hardware. Such hardware, however is not available on most conventional computer systems. Moreover, it has been found that an algorithm designed to run well in hardware does not perform in software as well as an algorithm optimized for software execution.

A stream cipher (or pseudorandom generator) is an algorithm that takes a short random string, and expands it into a much longer string, that still "looks random" to adversaries with limited resources. The short input string is called the seed (or key) of the cipher, and the long output string is called the output stream (or key-stream). Stream ciphers can be used for shared-key encryption, by using the output stream as a one-time-pad. Examples of systems using a stream cipher are given in U.S. Pat. No. 5,454,039 issued to Coppersmith et al. on Sep. 26, 1995 and U.S. Pat. No. 5,835,597 issued to Coppersmith et al. On Nov. 10, 1998. These patents are herein incorporated by reference in their entirety.

Figure 1:
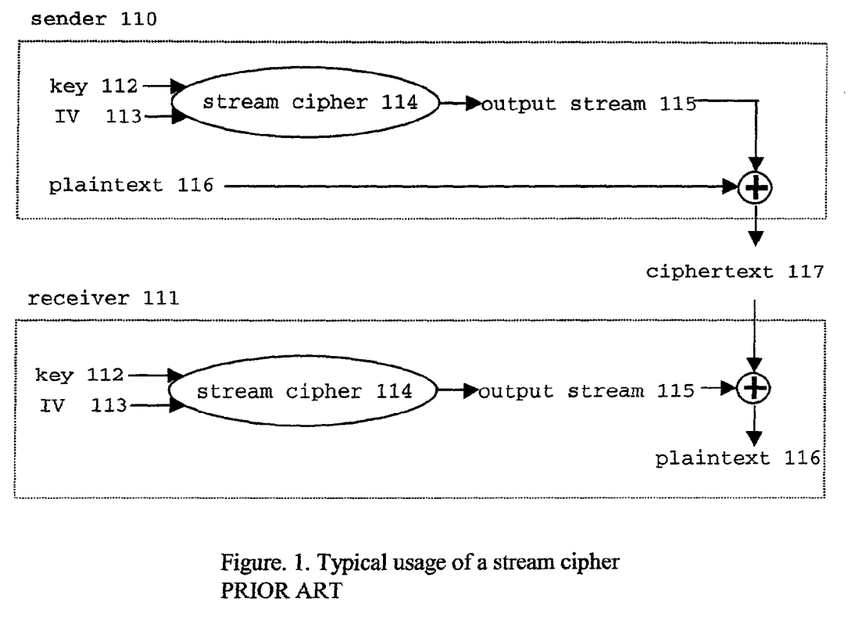
FIG. 1 is an example flow diagram of a prior art typical usage of stream ciphers.

An example flow diagram 100 of a prior art usage of stream ciphers is given in FIG. 1. In the system flow 100, a sender system 110 attempts to send a plaintext message 116 to a receiving system 111. To hide the plaintext from eavesdroppers, the sender 110 and the receiver 111 share a secret key 112. They may also share another string 113, which need not be secret (e.g., a counter value, that holds the value 1 for the first such plaintext message 116, the value 2 for the second message, etc.). The string 113 is usually called an IV (for Initial Value).

The sender 110 inputs the key 112 and the IV 113 to a stream cipher function 114. The output of the stream cipher function is an output stream 115. This output stream 115 is combined with plain text message 116 to produce encrypted ciphertext 117. (This combination is usually as simple as bitwise exclusive-OR, although it can be a different or even more complicated operation.) The ciphertext 117 is then sent to the receiving system, possibly over an insecure 15 communication channel. The receiving system 111 can then convert the ciphertext 117 back to plaintext 116. The receiving system does this by producing an identical output stream 115 using the key 112 and IV 113. This output stream 115 at the receiving system 111 is combined with the ciphertext 117 to produce the plaintext 116.

A more detailed explanation of stream ciphers is given in Chapter 6 of A. Menezes, P. Van Oorschot, and S. Vanstone, *Handbook of Applied Cryptography*, CRC Press, 1996 which is herein incorporated by reference in its entirety.

Figure 2:
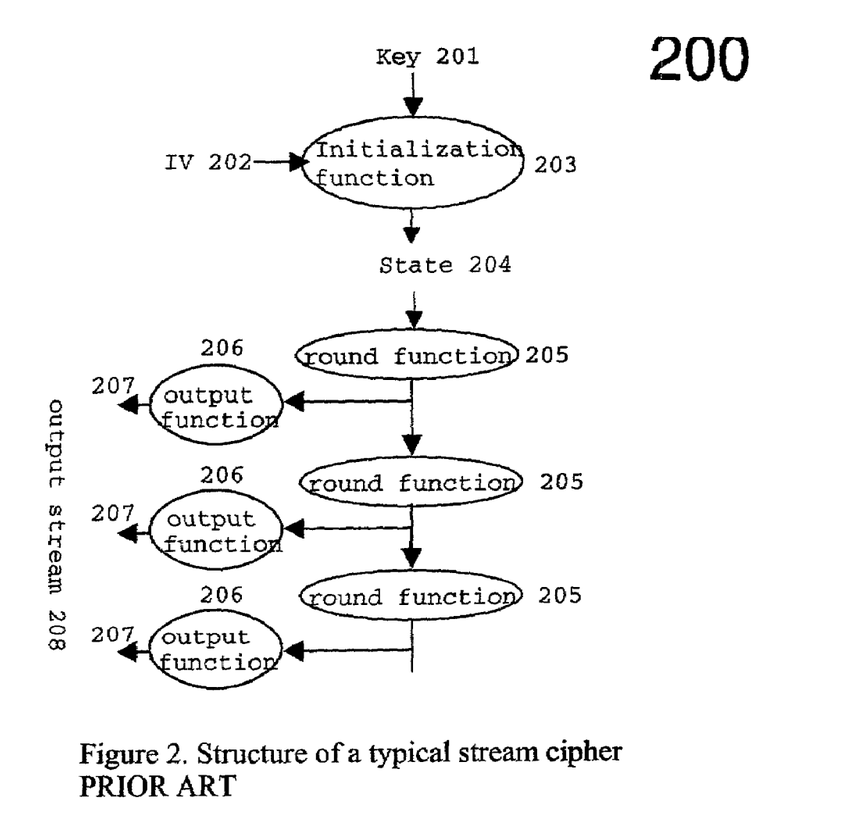
FIG. 2 is a flow chart of a typical prior art stream cipher.

FIG. 2 is a flow chart of a typical prior art stream cipher 200. The stream cipher 200 typically maintains some secret state 204, which is obtained from an initial key 201 (and possibly an IV 202) via an initialization function 203. In each of one or more steps, the state 204 is modified by a round-function 205. The output 207 of each of the steps is computed from the current state via an output-function 206. The output stream 208 is the concatenation of the outputs 207 from all the steps.

SEAL (Software Efficient ALgorithm) is a stream cipher that was designed in 1992 by Rogaway and Coppersmith, specifically for the purpose of obtaining a software efficient stream cipher. Nearly ten years after it was designed, SEAL is still the fastest steam cipher for software implementations on contemporary PC's, with "C" implementations running at 5 cycle/byte on common PC's (and 3.5 cycle/byte on some RISC workstations). A description of SEAL is found in U.S. Pat. No. 5,454,039 cited above and P. Rogaway and D. Coppersmith, "A software optimized encryption algorithm", Journal of Cryptology, 11(4), pages 273–287, 1998, which is herein incorporated by reference in its entirety.

In SEAL, the "round function" 205 is similar to round functions of typical block ciphers, and the "output function" 206 is simply a masking operation, where the current state is combined (via integer addition) with values from some fixed secret tables.

In terms of security, SEAL is somewhat of a mixed story. Recently, Fluhrer described an attack on SEAL 3.0, that can distinguish the output stream from random after about $2^{44}$ output bytes. See S. Fluhrer, "Cryptanalysis of the SEAL 3.0 pseudorandom function family", "Proceedings of the Fast Software Encryption Workshop" (FSE '01), 2001 which is herein incorporated by reference in its entirety.

As with most ciphers, there is a trade off between the speed and security of the ciphers. Therefore, there is a need in the prior art to gain more secure ciphers with the same (or faster) speeds or gain faster speeds without losing security.

OBJECTS OF THE INVENTION

An object of this invention is to provide an improved system and method for design of a secure stream cipher that has very fast implementations in software.

An object of this invention is an improved and more secure version of SEAL.

An object of this invention is a secure stream cipher that uses fewer system resources.

An object of this invention is improved tradeoff between speed and security in stream ciphers.

SUMMARY OF THE INVENTION

This invention is a system and method that uses a new "cryptographic core function" and an improved masking scheme to improve the tradeoff between speed and security of ciphers. The computer system generates a random output stream of bits. The system comprises an initial evolving state produced from one or more initial keys, one or more round functions, and one or more mask tables. Each round function is part of a step in a sequence of steps. Each step applies the respective round function to a current evolving state to produce a respective new evolving state for processing by the next step in the sequence. The first step in the sequence starts by processing the initial evolving state. The mask tables are produced from one or more of the initial keys. Each of the mask tables has one or more masks. The masks are combined, in each respective step, with the respective new evolving state in a combination operation to create a respective step output. The random output stream of bits is a concatenation of each of the respective step outputs. In one preferred embodiment, one or more of the masks in the mask tables are replaced by one or more replacement masks after a number of combination operations. The replacement masks not being linear combinations of prior masks. In an alternative embodiment, there are two or more mask tables produced from one or more of the initial keys. One or more of the masks from each table is combined, in each respective step, with the respective new evolving state in a combination operation to create a respective step output. There may or may not be replacement of the masks in this embodiment.

DETAILED DESCRIPTION OF THE INVENTION

This invention is a system and method that uses a new "cryptographic core function" and an improved masking scheme to improve the tradeoff between speed and security of ciphers.

Figure 3:
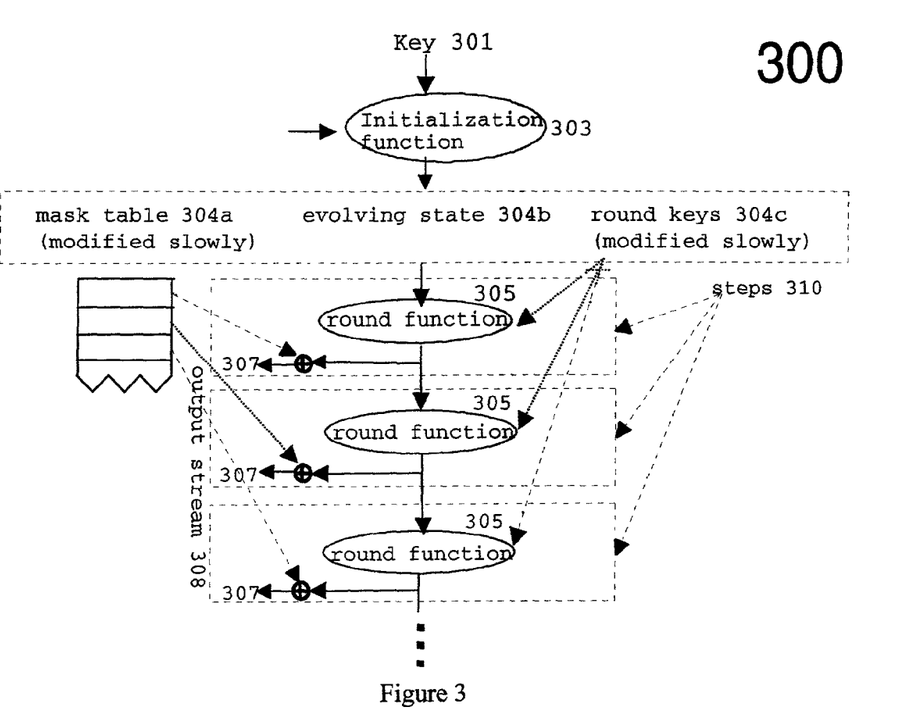
FIG. 3 is a system architecture drawing of the present invention.

FIG. 3 is a system architecture drawing of the present invention 300. The secret state of the cipher is made of three parts: an evolving state 304b, some round keys 304c, and a mask table 304a. The output stream is generated in steps. In each step, a round function 305 is applied to the evolving state 304b, using the round keys 304c. The result of the round function 305 is the new evolving state 304b. This new evolving state 304b is then combined with one or more of the entries in the mask table 304a, and the result is the output from the current step 307. To increase the security of the cipher, the mask table 303a should not be kept fixed, but instead it may be modified every so often. However, to maintain high speed, the masks should not be modified every step. In our preferred embodiments, each mask is used 16 times, and then it is modified by applying to it the round function 305. Modification of the mask can be done after different numbers of uses to optimize the tradeoff between speed and security for any given purpose.

This slow non-linear modification of the masks is one improved speed/security tradeoff of the present invention. In prior art, the masks were either kept completely fixed (e.g., SEAL), or rapidly modified via a linear process (a Linear-Feedback Shift-Register—LFSR). That made the cipher vulnerable to several statistical attacks. Moreover, when using LFSR, the rapid modification causes a significant slowdown in the cipher. Our invention improves upon prior art by modifying the mask table in a non-linear fashion, and in a slow manner. This feature permits our cipher to obtain a much higher security for only slightly more resource use, and with very little decrease in cipher speed, than when using a fixed table.

Figure 4:
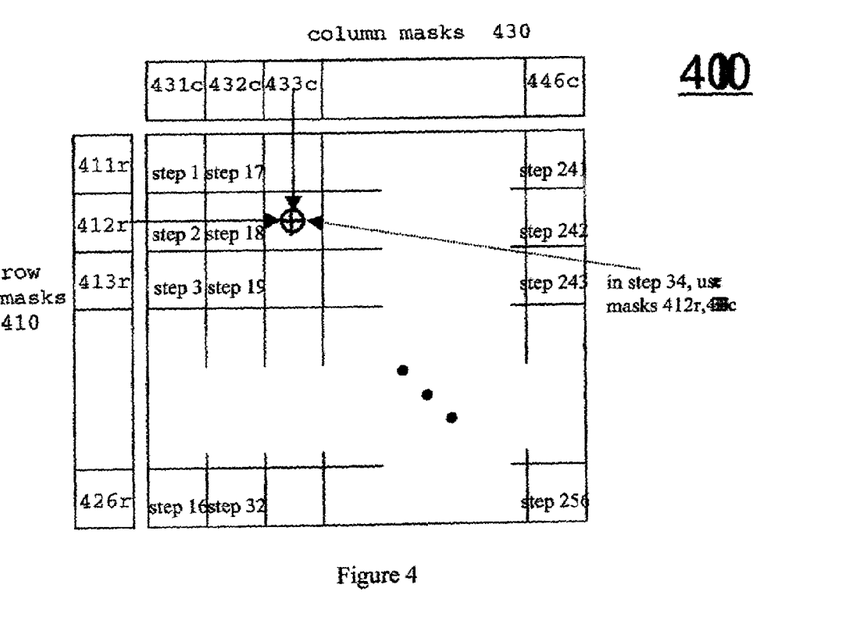
FIG. 4 is a drawing of a novel a two-dimensional masking scheme.

To further enhance the security of the cipher, the preferred embodiment uses a novel "2-dimensional masking scheme" 400 that is shown in FIG. 4. In a two-dimensional masking scheme 400, instead of just one mask table 303a, we use two tables of masks: a table of "column masks" 410 and a table of "row masks" 430. In a non-limiting example, described in FIG. 4, there are 16 masks in each of these two tables. In each step 310 of the cipher, we use one row mask and one column mask to combine with the current evolving state 304b to form the step output 307. In the preferred embodiment, the masks in these two tables are repeatedly used in *lexicographic order*. The first column mask is used together with all the row masks, in order, then the second column mask is used with all the row masks, in order, etc. When we exhaust all the combinations (i.e., after the last column mask is used together with the last row mask), all the masks in both tables are modified in a non-linear fashion. In the preferred embodiment, this is done by processing them with the round function 305. After the modification of the masks, we begin the lexicographic order anew, using again the first column mask with the first row mask.

In a different embodiment, one may use the value of the evolving state itself to determine the ordering of the masks. For example, one can use some of the bits of the evolving state as indices into the entries of the column- and row-tables, respectively, and combine the masks in these entries with the evolving state to form the step output.

In a preferred embodiment, the round function 304 is also novel. This embodiment of the round function 305 is described in more detail in FIG. 5. In this embodiment, the round function 305 uses two simultaneous non-linear permutations, which are combined using a mix of an SP network, and a Feistel ladder (SP-networks and Feistel ladders are defined in Chapter 7 of A. Menezes, P. Van Oorschot, and S. Vanstone, *Handbook of Applied Cryptography*, CRC Press, 1996, definitions 7.79 and 7.81, respectively).

Figure 5:
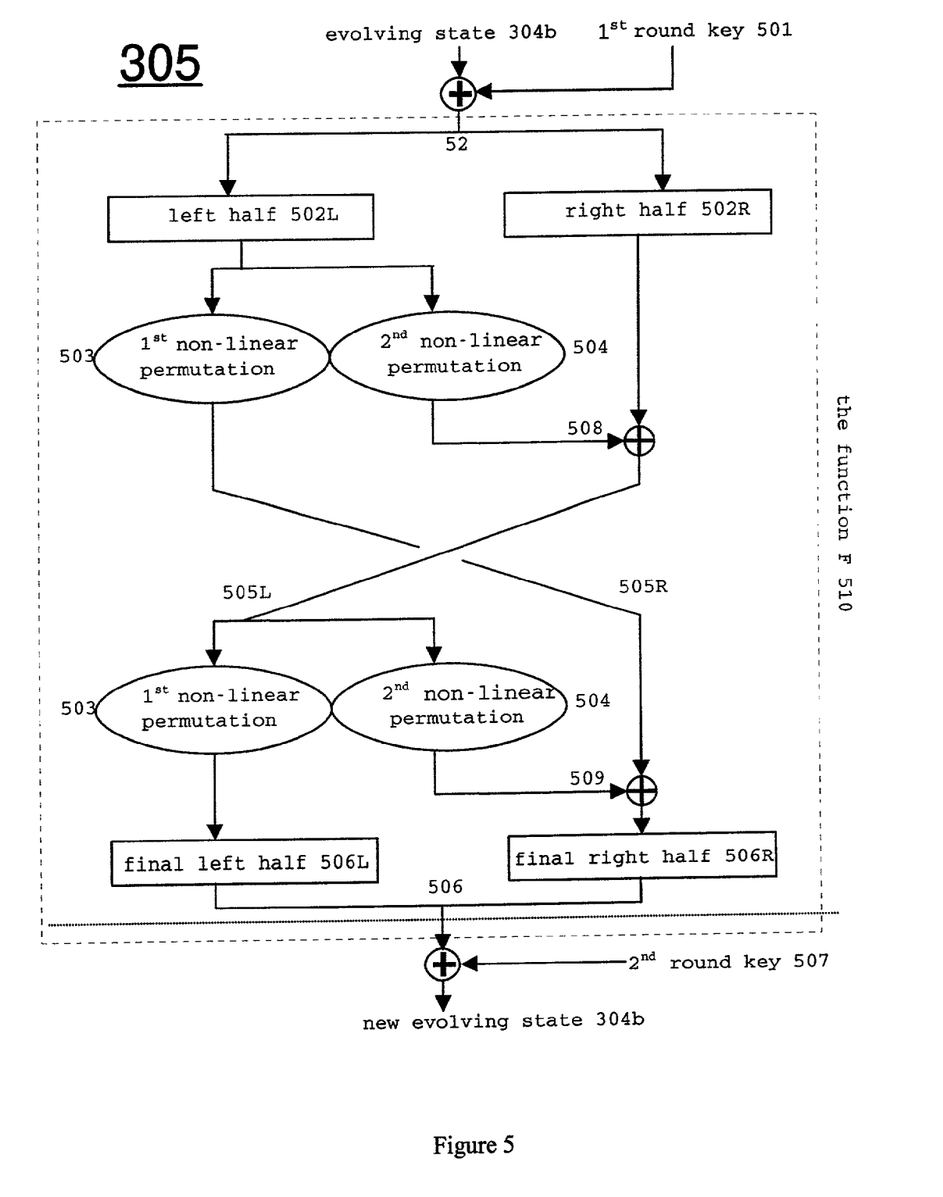
FIG. 5 is a flow chart of the preferred cryptographic round function used by the present invention

In the preferred embodiment, the non-linear permutations themselves are variants of the permutation that is used in the block cipher Rijndael, which was chosen as the new Advanced Encryption Standard (AES). (AES is described in the US Federal Information Processing Standards, Publication FIPS-197 from Nov. 26, 2001.) A block diagram of these non-linear permutations is provided in FIG. 6. For these particular non-linear permutations, the combination of SP network and a Feistel ladder from FIG. 5 is advantageous, since we can compute both permutations 503, 504 in the same time that it would take to compute one of them.

We now describe three preferred embodiments (variants) of our cipher.

The first preferred embodiment (variant), which we call Scream-0, is probably secure enough for most applications. However, we know of a "theoretical attack" that can distinguishes Scream-0 from random after seeing about $2^{44}$ bytes of the output stream. (This attack is only theoretical, since it requires more time and space than is feasibly available using current technologies.) Still we disclose two different ways of strengthening Scream-0. We believe that both these variants meet our security goal, but they offer some different tradeoffs.

A second preferred embodiment, which we call Scream, has software implementations as fast as Scream-0, but to get this speed one has to use secret tables roughly as large as those of SEAL.

A third preferred embodiment, called Scream-F (for Fixed S-box), uses smaller state, but is about 10–15% slower than Scream or Scream-0.

In the non-limiting description below we use the following notations: byte strings (blocks) are usually denoted by lowercase English letters, x,y,z, etc. Byte i of x is x_i, and bytes i-through-j are denoted x_{i..j}, where indexing starts from 0. We also index from 0 when we talk about entries in a table (so W[0] is the first entry in the table W). For two blocks x,y of the same length, we denote by x⊕y as the bitwise exclusive-OR of x and y, and by x∧y as their bitwise AND.

The Cipher Scream-0

FIG. 5 is a flow chart of a preferred round function 305 of the present invention. In this preferred embodiment, our round function uses two non-liner permutations that operate on 64-bit blocks, and these permutations are combined using a mix of SP-network and Feistel ladder. (In this example embodiment, the non-linear permutations (either 503 or 504) are a scaled-down version of the Rijndael round function.) However, any known or yet to be developed cryptographic function can be used.

As stated above, the round function uses two different instances of non-liner permutation, which we refer to simply as the first and second non-liner permutations (503 and 504, respectively). The evolving state 304b is first added to a first round-key 501, and the result 502 is split in two, a right half 502R (first part), and a left half 502L (second part). Then, we apply both a first non-linear permutation 503 and a second non-linear permutation 504 to the left half 502L.

Applying the first non-liner permutation 503 to the left half 502L, yields a new right half 505R (first part first result).

We apply the second non-liner permutation 504 to the left half 502L, thus getting a first temporary value 508 (first part second result), which is then combined with the right half 502R, to yield the new left half 505L (interim second part).

In a preferred embodiment, this process is then repeated. We apply the first non-liner permutation 503 to the new left half 505L, thus getting the final left half 506L (final first result). We also apply the second non-liner permutation 504 to the new left half 505L, to get a second temporary value 509 (interim second part second result), and combine this temporary value with the new right half 505R, thus getting the final right half 506R (final second result). The two halves 506L and 506R are concatenated, to form one block 506. Last, the block 506 is combined with a second round key 507, to form the new evolving state 304b. In the description of the main body of Scream below, we denote by F(x) the round function without the addition of the round keys i.e., the part inside the dashed box 510 in FIG. 5).

Figure 6:
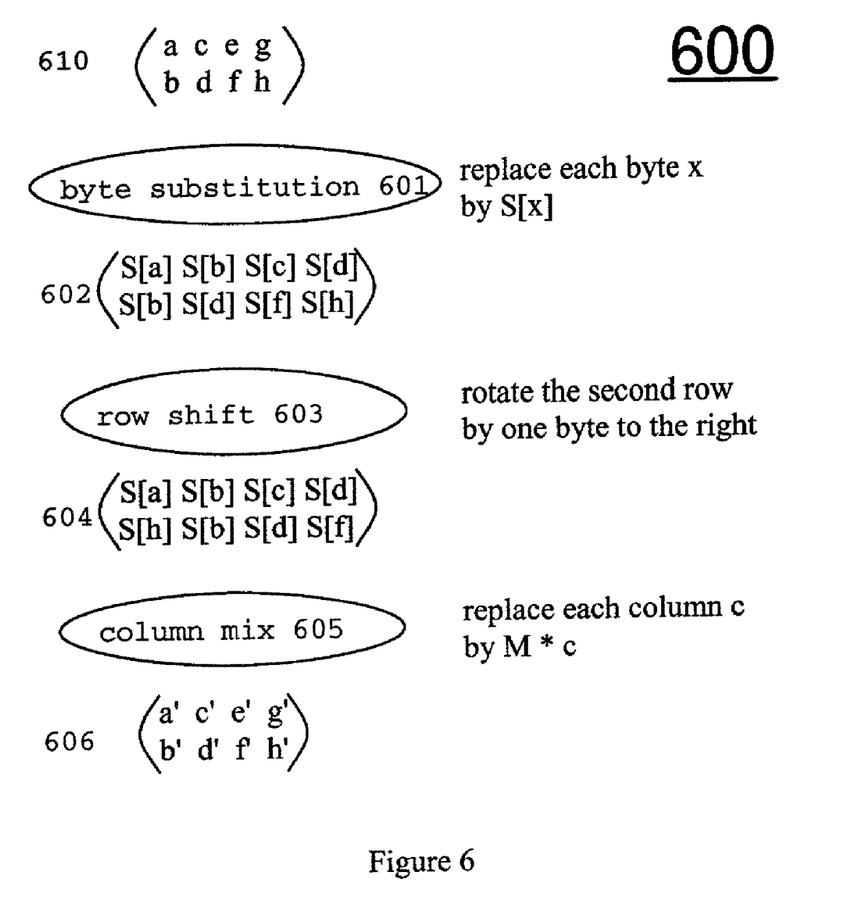
FIG. 6 is a drawing of a non-linear permutation that is used in the cryptographic round function of the present invention.

FIG. 6 is a flow chart 600 of the preferred embodiment of the non-linear permutations (503 and 504) used by the invention. The 64-bit input block is viewed as a 2×4 matrix of bytes 610. First, we apply byte-substitution 601, where each byte is sent through an invertible S-box, S[*]. Then the second row in the resulting matrix 602 is shifted cyclically by one byte to the right. Finally each column in the matrix 604 is multiplied by a fixed 2×2 invertible matrix M. We note that this permutation depends on the table S[*] and the matrix M, and denote it by $G_{S,M}(x)$.

In the preferred embodiment of the round function 305 of Scream, we use two different instances of this non-linear permutation 503, 504, with different S'es and M's. We call these the two "half-round functions", and denote them by $G_{S1,M1}(x)$, $G_{S2,M2}(X)$. The S-boxes S1, S2 are derived from the S-box that is used in the round function of Rijndael. In a preferred embodiment, we use S1[x]=S[x], and S2[x]=S[x⊕00010101], where S[*] is the Rijndael S-box, which is described below. The constant 00010101 (decimal 21) was chosen so that S2 will not have a fixed-point or an inverse fixed-point. The matrices M1, M2 were chosen so that they are invertible, and so that neither of M1, M2 and $M2^{-1} \times M1$ contains any zeros. Specifically, we use $$M1 = \begin{pmatrix} 1 & x \\ x & 1 \end{pmatrix} \quad M2 = \begin{pmatrix} 1 & x+1 \\ x+1 & 1 \end{pmatrix}$$

where 1, x, x+1 are elements of the field GF(256), which is represented as the quotient $Z_2[x]/(x^8+x^7+x^6+x+1)$ The table S[*] that is used to define S1 and S2 is the following table.

table S[*] =
[99, 124, 119, 123, 242, 107, 111, 197, 48, 1, 103, 43, 254, 215, 171,
118, 202, 130, 201, 125, 250, 89, 71, 240, 173, 212, 162, 175, 156, 164,
114, 192, 183, 253, 147, 38, 54, 63, 247, 204, 52, 165, 229, 241, 113,
216, 49, 21, 4, 199, 35, 195, 24, 150, 5, 154, 7, 18, 128, 226, 235, 39,
178, 117, 9, 131, 44, 26, 27, 110, 90, 160, 82, 59, 214, 179, 41, 227, 47,
132, 83, 209, 0, 237, 32, 252, 177, 91, 106, 203, 190, 57, 74, 76, 88, 207,
208, 239, 170, 251, 67, 77, 51, 133, 69, 249, 2, 127, 80, 60, 159, 168,
81, 163, 64, 143, 146, 157, 56, 245, 189, 182, 218, 33, 16, 255, 243,
210, 205, 12, 19, 236, 95, 151, 68, 23, 196, 167, 126, 61, 100, 93, 25,
115, 96, 129, 79, 220, 34, 42, 144, 136, 70, 238, 184, 20, 222, 94, 11,
219, 224, 50, 58, 10, 73, 6, 36, 92, 194, 211, 172, 98, 145, 149, 228, 121,
231, 200, 55, 109, 141, 213, 78, 169, 108, 86, 244, 234, 101, 122, 174, 8,
186, 120, 37, 46, 28, 166, 180, 198, 232, 221, 116, 31, 75, 189, 139, 138,
112, 62, 181, 102, 72, 3, 246, 14, 97, 53, 87, 185, 134, 193, 29, 158,
225, 248, 152, 17, 105, 217, 142, 148, 155, 30, 135, 233, 206, 85, 40,
223, 140, 161, 137, 13, 191, 230, 66, 104, 65, 153, 45, 15, 176, 84, 187,
22]

In the preferred embodiment, we use several optimizations to implement our 2-dimensional masking scheme. We want to use 16 masks in each of the column and row mask tables, so in principle we need two sets of 16 masks each. However, we note that with the column masks, we use the same mask for 16 consecutive steps, and then never use it again until it is modified. Therefore, we can store only one column mask, and compute the next mask via the round function. For example, in the first 16 steps in a batch we only store the column mask 431c, and for step 17, we compute the mask 432c by processing the previous mask 431c using the round function 305. Moreover, since in the preferred embodiment of the round function (from FIG. 5) we use the two round keys (501 and 507 in that figure) in a linear fashion, then we can view these keys as our column mask, and we do not need to have a separate column mask. Also, instead of using the two round keys completely unchanged for 16 steps, we rotate one of them by a few bytes after each use. Finally, instead of modifying all the 16 row masks at once every 256 steps, we modify one row mask every 16 steps. This process is explicitly described in the pseudo-code below.

Figure 7:
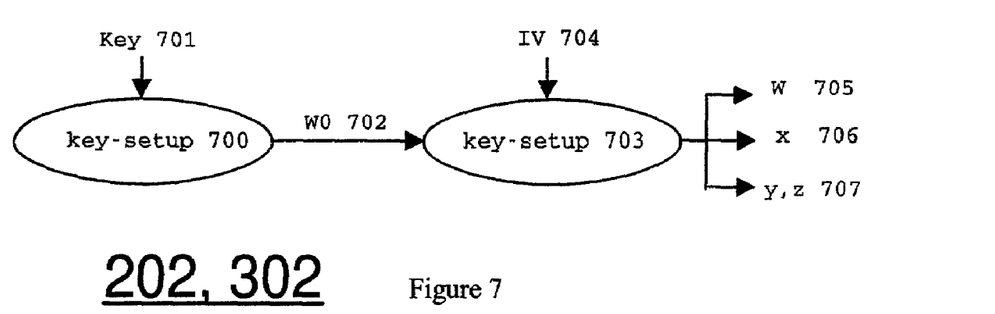
FIG. 7 is a flow chart of a key and nonce setup used in the present invention.

The main body of the Scream-0 (and Scream) is as follows. The secret state consists of 16 bytes of "evolving state", denoted x, two 16-byte "round keys", denoted y,z, and a "mask table" with 16 blocks, each of 16 bytes, denoted W. (The table W should be through of as the "row masks" of the two-dimensional masking scheme, and y,z should be thought of as the column masks.) The steps of Scream-0 are split into batches of 16×16=256 steps each. In each batch, we perform the following operations:

One batch of steps in Scream-0:

1. for i goes from 0 to 15 do
2.   for j goes from 0 to 15 do
3.     x ← F(x ⊕ y)         //F is the function from FIG. 5
4.     x ← x ⊕ z
5.     output x ⊕ W[j mod 16]
6.     if j = 0 or 2 mod 4
7.       rotate y by 8 bytes, y←y_{8..15, 0..7}
8.     else if j = 1 mod 4
9.       rotate each half of y by 4 bytes,
         y←y_{4..7 0..3 12..15 8..11}
10.    else if j <15
11.      rotate each half of y by 4 bytes to the right,
         y←y_{5..7 0..4 13..15 8..12}
12.    else                           //j15
13.      y←F(y ⊕ z)
14.      z←F(z ⊕ y)
15.      W[i mod 16]←F(W[i mod 16])
16.    end-if
17.  end-for
18. end-for FIG. 7 is a flow chart of an initialization function (202, 302) used by the invention. The initialization function (202, 302) of Scream consists of two parts. The first part is the key-setup 701, which takes as input a 16-byte key 701, and initializes the table W0 702, with 16 blocks, each of 16 bytes. The second part is the nonce-setup 703, that takes the table W0 702 and a 16-byte IV 704, and outputs the mask table W 705, the evolving state x 706 and the round keys y and z 707. In a preferred embodiment, the key-setup and nonce-setup procedures are quite straightforward: We just use the function F to derive all the quantities that we need. Below is a pseudo-code for these procedures. In this procedure S[x] is the S-box that is used in Rijndael.

Scream-0 key-setup (input is a 16-byte key).

1. set S1[x] = S[x] for all x in {0 ... 255}   // S[] is the Rijndael S-box
2. set S2[x] = S1[x ⊕ 00010101] for all x in {0 ... 255}
3. a←key
4. b←F(a ⊕ pi)         //pi is the first 16 bytes in the expansion of π =3.14...
5. for i =0 to 15
6.   a←F(F(F(F(a)))) ⊕ b   //four applications of the function F
7.   W0[i]←a
8. end-for
9. output W0

Scream-0 nonce-setup (input is a 16-byte IV):

1. z←F(F(IV ⊕ W0[1]))     //two applications of the function F
2. y←F(F(z ⊕ W0[3]))
3. a←F(F(y ⊕ W0[5]))
4. x←F(F(a ⊕ W0[7]))
5. b←x
6. for i = 0 to 7
7.   b←F(b ⊕ W0[2i])
8.   W[2i]←W0[2i] ⊕ a
9.   W[2i+1]←W0[2i+1] ⊕ b
10. end-for
11. output W0, x, y, z The constant pi that is used in the key-setup procedure from above is an array of 16 bytes as follows: pi[*]=[36, 63, 106, 136, 133, 163, 8, 211, 19, 25, 138, 46, 3, 112, 115, 68]

The ciphers Scream-S and Scream-F

A detailed analysis shows that the cipher Scream-0 as described so far is not as secure as one might have hoped. In particular, there is a "theoretical attack" (that requires about $2^{50}$ space and $2^{96}$ time) that can distinguish Scream-0 from random after seeing only about $2^{44}$ bytes of the output stream. We therefore propose Scream-S and Scream-F as two variations on Scream-0, that offer better resistance to such attacks.

The cipher Scream is the same as Scream-0, except that the S-boxes S1[*], S2[*] (that are used in the byte substitution operation 601) are derived from the Rijndael S-box S[*] in a key-dependent fashion. Specifically, we replace line 1 in the pseudo code for key-setup from above for key-setup, by the following:

1. set $S1[x] = S[...S[S[x + key_0] + key_1]... + key_{16}]$
   for all $x$ in $\{0...255\}$ where + denotes integer addition modulo 256. In terms of speed (in software), Scream is just as fast as Scream-0, except for the key-setup. However, it has a much larger secret state (a speed-optimized software implementation of Scream-S uses additional 2 Kbyte of secret tables).

A different approach is to keep the S-box fixed, but to add to the main body of the cipher some "key dependent operation" before outputting each block. In Scream-F, after modifying the "evolving state" x using F, we added one round of Feistel ladder, using a key-dependent table. However, since the only key-dependent table that we have is the mask table W, we let W double also as an "S-box". We add lines 3a-3e to the main-body routine from above, between lines 3 and 4.

3a. view the table W as an array of 64 4-byte words $\underline{W}[0...63]$

3b. $x\_\{0...3\} = x\_\{0...3\} \oplus \underline{W}[1 + (x\_4 \wedge 00111110)]$ 3c. $x\_\{4...7\} = x\_\{4...7\} \oplus \underline{W}[x\_8 \wedge 00111110]$ 3d. $x\_\{8...11\} = x\_\{8...11\} \oplus \underline{W}[1 + (x\_12 \wedge 00111110)]$ 3e. $x\_\{12...15\} = x\_\{12...15\} \oplus \underline{W}[x\_0 \wedge 00111110]$ We note that the operation $x\_i \wedge 00111110$ in these lines returns an even number between 0 and 62, so we only use odd entries of W to modify $x\_\{0..3\}$ and $x\_\{8..11\}$, and even entries to modify $x\_\{4..7\}$ and $x\_\{12..15\}$. The reason is that to form the output block, the words $x\_\{0.3\}$, $x\_\{8..11\}$ will be masked with even entries of W, and the words $x\_\{4..7\}$, $x\_\{12..15\}$ will be masked by odd entries. The odd/even indexing is meant to avoid the possibility that these masks cancel with the entries that were used in the Feistel operation.

The overall goal of the current work was to come up with a "more secure SEAL". Going into this project, our design goals for the cipher were as follows:

Higher security than SEAL: It should be possible to use the same seed for $2^{64}$ bytes of output. This is achieved mainly by adopting a better masking scheme. By changing each masks after 16 times that it is used, we significantly increase the security of the scheme. By using both the round key and the masks for masking (the 2D scheme), security is enhanced further. Another contribution is the round function itself, which by some measures is more secure than the round function of SEAL.

Comparable speed to SEAL, i.e., about 5 cycles per byte on common PC's. Again, we use a fast round function and we do not modify the masks and keys too often.

Other, secondary, goals were to use smaller tables (SEAL uses 4 KB of secret tables), get faster initialization (SEAL needs about 200 applications of SHA to initialize the tables), and maybe make the cipher more amenable to implementation in other environments (e.g., hardware, smartcard, etc.) We also tried to make a cipher that will be fast on 64-bit architectures too. These goals were achieved by a careful design of the round function and the initialization function.

We claim:

1. A computer implemented system for generating a random output stream of bits, the system comprising:
    a processor; and
    a memory, including a program executable by the processor, the program producing:
        an initial evolving state produced from one or more initial keys;
        one or more round functions, each round function being part of a step in a sequence of steps, each step applying the respective round function to a current evolving state to produce a respective new evolving state for processing by the next step in the sequence, the initial evolving state processed by the first step in the sequence; and
        one or more mask tables produced from one or more of the initial keys, each of the mask tables having one or more masks, one or more of the masks being combined, in each respective step, with the respective new evolving state in a combination operation to create a respective step output, the random output stream being a concatenation of all the respective step outputs, and one or more of the masks in the mask tables being replaced by one or more replacement masks after the combination operation is performed a predetermined number of times, the replacement masks not being linear combinations of prior masks,
        wherein the random output stream of bits is for encrypting data.

2. A computer system, as in claim 1, where the predetermined number of times is greater than 1.

3. A computer system, as in claim 1, where the predetermined number of times is 16.

4. A computer system, as in claim 1, where one or more of the masks is used in more than one of the combination operations before the mask is replaced by the replacement mask.

5. A computer system, as in claim 1, where two or more tables are produced from the initial keys and one or more mask from each table is used in the combination operation.

6. A computer system, as in claim 5, where the masks from the tables are used in the combination operation in an order.

7. A computer system, as in claim 6, where the order is determined by a value of the respective new evolving state.

8. A computer system, as in claim 5, where the masks from the tables are used in the combination operation in a lexicographical order.

9. A computer system for generating a random output stream of bits, the system comprising:
    a processor; and
    a memory, including a program executable by the processor, the program producing:
        an initial evolving state produced from one or more initial keys;
        one or more round functions, each round function being part of a step in a sequence of steps, each step applying the respective round function to a current evolving state to produce a respective new evolving state for processing by the next step in the sequence, the initial evolving state processed by the first step in the sequence; and
        two or more mask tables produced from one or more of the initial keys, each of the mask tables having one or more masks, one or more of the masks from each table being combined, in each respective step, with the respective new evolving state in a combination of all the respective step outputs,
        wherein the random output stream of bits is for encrypting data.

10. A computer system, as in claim 9 where the masks from the tables are used in the combination operation in an order.

11. A computer system, as in claim 9, where the masks from the tables are used in the combination operation in a lexicographical order.

12. A computer system, as in claim 9, where the order is determined by a value of the respective new evolving state.

13. A computer system, as in claim 9, where the round function is a non linear permutation.

14. A computer system, as in claim 13, where the non linear permutation includes any one or more of the following: a substitution-perumutation network and a Feistel ladder.

15. A computer system, as in claim 13, where the non linear permutation performed by the round function comprises the following steps:
    dividing the current evolving state into a first part and one or more second parts;
    applying a first non linear function to the first part to create a first part first result;
    applying one or more second non linear functions to the first part to create one or more first part second results;
    combining one or more first part second results to one or more of the second parts to create one or more respective interim second parts; and
    concatenating the first part first result and the interim second parts to create a new evolving state.

16. A computer system, as in claim 13, where the non linear permutation performed by the round fUnction comprises the following steps:
    dividing the current evolving state into a first part and a second part;
    applying a first non linear fUnction to the first part to create a first part first result;
    applying a second non linear fUnction to the first part to create a first part second result;
    combining the first part second result to the second part to create a respective interim second part;
    applying the first non linear fUnction to the interim second part to create a final first result;
    applying the second non linear fUnction to the interim second part to create an interim second part second result;
    combining the interim second part second result with the first part second result to create a final second result; and concatenating the final first result and the final second result to create a new evolving state.

17. A computer implemented method for generating a random output stream of bits comprising the steps of:
   A. producing a current evolving state from one or more initial keys;
   B. producing one or more mask tables from one or more of the initial keys, each of the mask tables having one or more masks;
   C. applying a round function to a current evolving state to produce a respective new evolving state;
   D. replacing the current evolving state with the new evolving state;
   E. combining one or more of the masks with the current evolving state in a combination operation to create a respective step output;
   F. replacing one or more of the masks in the mask tables by one or more replacement masks after a number of combination operations, the replacement masks not being linear combinations of prior masks;
   G. repeating steps C through F one or more times;
   H. concatenating all the respective step outputs to create the random output stream; and
   I. using the random output stream of bits for encrypting data.

18. A method, as in claim 17, where the round function is non linear perturbation method comprising the steps of:
   dividing the current evolving state into a first part and one or more second parts;
   applying a first non linear function to the first part to create a first part first result;
   applying one or more second non linear functions to the first part to create one or more first part second results;
   combining one or more first part second results to one or more of the second parts to create one or more respective interim second parts; and
   concatenating the first part first result and the interim second parts to create a new evolving state.

19. A computer program product stored on a computer readable medium for generating a random output stream of bits, which when executed by a computer performs the steps of:
   A. producing a current evolving state from one or more initial keys;
   B. producing one or more mask tables from one or more of the initial keys, each of the mask tables having one or more masks;
   C. applying a round function to a current evolving state to produce a respective new evolving state;
   D. replacing the current evolving state with the new evolving state;
   E. combining one or more of the masks with the current evolving state in a combination operation to create a respective step output;
   F. replacing one or more of the masks in the mask tables by one or more replacement masks after a number of combination operations, the replacement masks not being linear combinations of prior masks;
   G. repeating steps C through F one or more times;
   H. concatenating all the respective step outputs to create the random output stream; and
   I. using the random output stream of bits is for encrypting data.

20. A computer system for generating a random output stream of bits, the system comprising:
   A. means for producing a current evolving state from one or more initial keys;
   B. means for producing one or more mask tables from one or more of the initial keys, each of the mask tables having one or more masks;
   C. means for applying a round function to a current evolving state to produce a respective new evolving state;
   D. means for replacing the current evolving state with the new evolving state;
   E. means for combining one or more of the masks with the current evolving state in a combination operation to create a respective step output;
   F. means for replacing one or more of the masks in the mask tables by one or more replacement masks after a number of combination operations, the replacement masks not being linear combinations of prior masks;
   G. means for repeating steps C through F one or more times;
   H. means for concatenating all the respective step outputs to create the random output stream; and
   I. means for using the random output stream of bits for encrypting data.

* * * * *